United States Patent [19]

Cocoma et al.

[11] Patent Number: 5,331,254
[45] Date of Patent: Jul. 19, 1994

[54] STARTING CIRCUIT FOR AN ELECTRODELESS HIGH INTENSITY DISCHARGE LAMP EMPLOYING A VISIBLE LIGHT RADIATOR

[75] Inventors: John P. Cocoma; George A. Farrall, both of Rexford, N.Y.

[73] Assignee: General Electric Company, Schenectady, N.Y.

[21] Appl. No.: 5,954

[22] Filed: Jan. 19, 1993

[51] Int. Cl.[5] .............................. H05B 41/16
[52] U.S. Cl. ................... 315/248; 315/344; 315/241 R; 315/85
[58] Field of Search ............... 315/248, 344, 85, 39, 315/241 R; 313/234, 224, 348, 198, 184, 567

[56] References Cited

U.S. PATENT DOCUMENTS

| 4,810,938 | 3/1989 | Johnson et al. ............. 315/85 |
| 4,812,702 | 3/1989 | Anderson .................... 313/153 |
| 4,950,059 | 8/1990 | Roberts ...................... 313/567 X |
| 4,972,120 | 11/1990 | Witting ...................... 313/638 |
| 5,039,903 | 8/1991 | Farrall ........................ 313/160 |
| 5,057,750 | 10/1991 | Farrall et al. ............... 315/248 |
| 5,095,249 | 3/1992 | Roberts et al. .............. 315/248 |
| 5,103,140 | 4/1992 | Cocoma et al. ............. 315/248 |
| 5,118,996 | 6/1992 | El-Hamamsy et al. ..... 315/248 |

OTHER PUBLICATIONS

G. F. Weston, Cold Cathode Glow Discharge Tubes, ILIFFE Books Ltd., London, 1968, pp. 156-158.

Primary Examiner—Robert J. Pascal
Assistant Examiner—Haissa Philogene
Attorney, Agent, or Firm—Jill M. Breedlove; Marvin Snyder

[57] ABSTRACT

A starting circuit for an electrodeless HID lamp includes a visible light radiator for illuminating a gas probe starter during lamp starting. In one embodiment, a light emitting diode (LED) illuminates the gas probe starter via a quartz tube. Excitation is provided to the LED by the same source used to excite the gas probe starter.

10 Claims, 1 Drawing Sheet

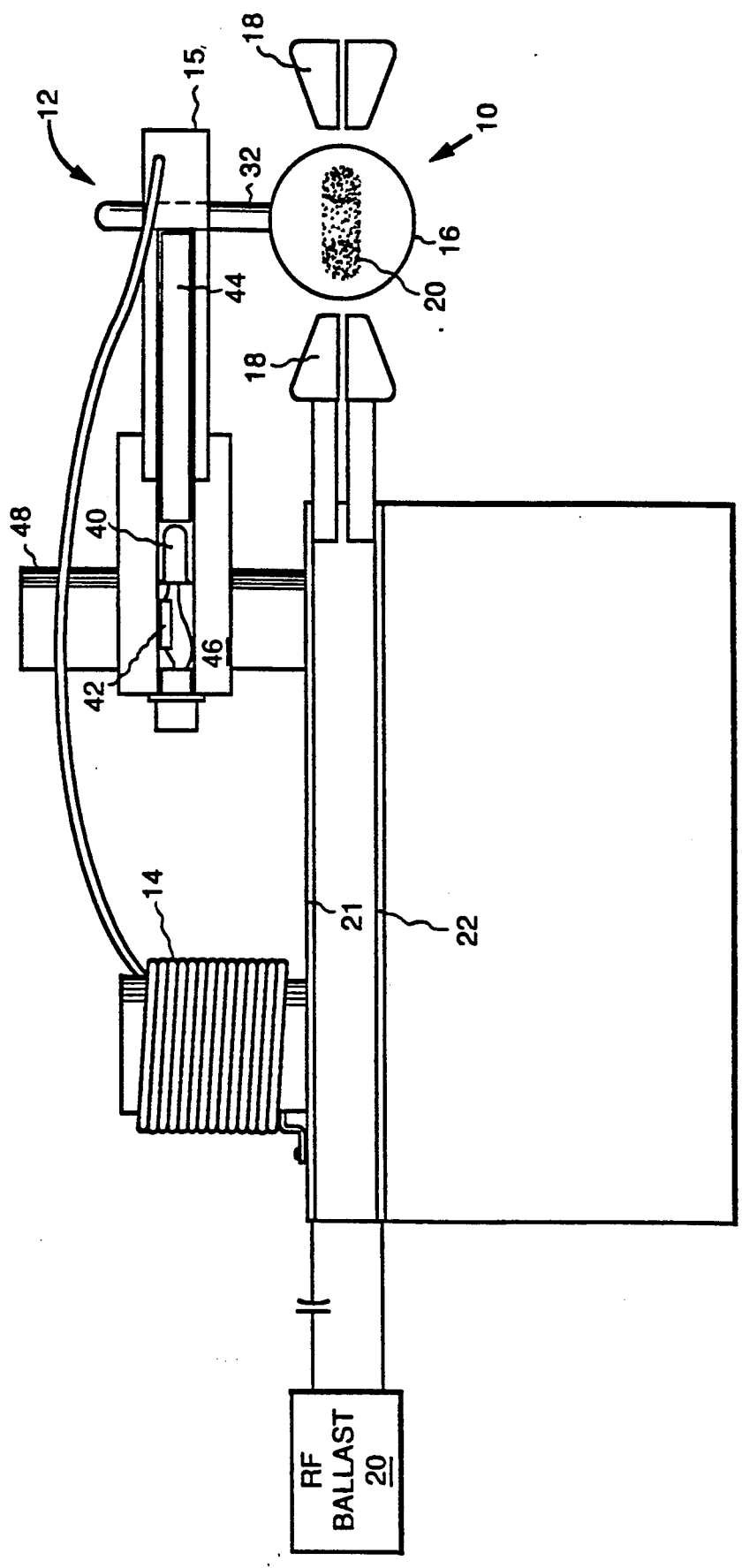

STARTING CIRCUIT FOR AN ELECTRODELESS HIGH INTENSITY DISCHARGE LAMP EMPLOYING A VISIBLE LIGHT RADIATOR

FIELD OF THE INVENTION

The present invention relates generally to electrodeless high intensity discharge (HID) lamps and, more particularly, to a starting circuit therefor which employs a visible light radiator to enhance ignition of an arc discharge.

BACKGROUND OF THE INVENTION

To enhance the ignition probability of electrical discharges in gases, it is common practice to illuminate the gases with ultraviolet radiation. Lamp starting is enhanced in this manner because the energy equivalent of the ultraviolet radiation exceeds the ionization potential of many gases. The ultraviolet radiation thus causes a small amount of the gases to ionize. The resulting free electrons can be accelerated by an applied electric field to have sufficient kinetic energy to produce successive, multiplicative ionization events, resulting in a discharge avalanche and breakdown of gases needed to start a lamp.

Generally, a breakdown avalanche requires at least one free electron to begin the process. Although normal background cosmic radiation can serve the purpose of generating the required free electron, the electron production rate is too low to be of practical use in applications where available ignition voltage is limited and/or where ignition time must be less than a specified interval, resulting in long time intervals, i.e., statistical time lags. The use of ultraviolet light substantially shortens these time intervals for a given applied voltage. Alternatives to ultraviolet radiation are other types of high energy radiation such as might be obtained from a variety of radioactive materials. Such alternative approaches, however, are generally costly or pose questions of safety.

Accordingly, it is desirable to provide a starting circuit for an electrodeless HID lamp which enhances ignition of an arc discharge, without requiring the use of an ultraviolet radiator or higher-energy radiators which are costly or potentially unsafe.

SUMMARY OF THE INVENTION

A starting circuit for an electrodeless HID lamp includes a visible light radiator for illuminating a gas probe starter during lamp starting. In one embodiment, a light emitting diode (LED) illuminates the gas probe starter via a light pipe comprising a quartz tube. Excitation is provided to the LED by the same source used to excite the gas probe starter, e.g., a resonant starting circuit.

BRIEF DESCRIPTION OF THE DRAWING

The features and advantages of the present invention will become apparent from the following detailed description of the invention when read with the accompanying drawing in which:

FIG. 1 schematically illustrates an electrodeless HID lamp employing a starting circuit with a visible light radiator for enhancing ignition of an arc discharge according to the present invention.

DETAILED DESCRIPTION OF THE INVENTION

FIG. 1 illustrates an electrodeless HID lamp system, including an electrodeless HID lamp 10 employing a gas probe starter 12 coupled to a starting coil 14 via a starting electrode/support 15 (e.g., of a metal such as aluminum). Lamp 10 includes a light-transmissive arc tube 16 preferably formed of a high temperature glass, such as fused quartz, or an optically transparent ceramic, such as polycrystalline alumina. An excitation coil 18 surrounds arc tube 16 and is coupled to a radio frequency ballast, via plates 21 and 22 of a capacitor at the output thereof, for excitation of an arc discharge 20 in a fill contained within the arc tube. A suitable ballast is described in commonly assigned U.S. Pat. No. 5,057,750 of G.A. Fartall and J.P. Cocoma, issued Oct. 15, 1991 and incorporated by reference herein.

A suitable arc tube fill is described in commonly assigned U.S. Pat. No. 4,810,938 of P.D. Johnson, J.T. Dakin and J.M. Anderson, issued on Mar. 7, 1989, which patent is incorporated by reference herein. The fill of the Johnson et al. patent comprises a sodium halide, a cerium halide and xenon combined in weight proportions to generate visible radiation exhibiting high efficacy and good color rendering capability at white color temperatures. For example, such a fill according to the Johnson et al. patent may comprise sodium iodide and cerium chloride, in equal weight proportions, in combination with xenon at a partial pressure of about 500 torr. Another suitable fill is described in commonly assigned U.S. Pat. No. 4,972,120 of H.L. Witting, issued Nov. 20, 1990, which patent is also incorporated by reference herein. The fill of the Witting patent comprises a combination of a lanthanum halide, a sodium halide, a cerium halide and xenon or krypton as a buffer gas. For example, a fill according to the Witting patent may comprise a combination of lanthanum iodide, sodium iodide, cerium iodide, and 250 torr partial pressure of xenon.

Excitation coil 18 is illustrated as comprising a two-turn coil having a configuration such as that described in U.S. Pat. No. 5,039,903 of G.A. Farral, cited hereinabove. Such a coil configuration results in very high efficiency and causes minimal light blockage from the lamp. The overall shape of the excitation coil of the Fartall patent is generally that of a surface formed by rotating a bilaterally symmetrical trapezoid about a coil center line situated in the same plane as the trapezoid, but which line does not intersect the trapezoid. However, other suitable coil configurations may be used, such as that described in commonly assigned U.S. Pat. No. 4,812,702 of J.M. Anderson, issued Mar. 14, 1989, which patent is incorporated by reference herein. In particular, the Anderson patent describes a coil having six turns which are arranged to have a substantially V-shaped cross section on each side of a coil center line. Another suitable excitation coil may be of solenoidal shape, for example. Still another suitable excitation coil may be of a spiral type which conforms to, but is spaced apart from, at least a portion of the arc tube.

Gas probe starter 12 is illustrated as being of a type described in commonly assigned Roberts et al. U.S. Pat. No. 5,095,249, issued Mar. 10, 1992 and incorporated by reference herein. In particular, gas probe starter 12 is shown as comprising a starting electrode (which in this embodiment also comprises probe support 15) coupled to a starting chamber 32 which is attached to the outer wall of arc tube 16 and contains a gas. The gas in starting chamber 32 may comprise, for example, a rare gas at a pressure in the range from approximately 0.5 to 500 torr, with a preferred range being from approximately 5 to 40 torr. Preferably, the gas in chamber 32 is at a low pressure relative to that of the arc tube fill in order to promote even easier starting. In an exemplary HID lamp system, a suitable arc tube fill pressure may be approximately 200 torr while that of the gas in chamber 32 may be approximately 20 torr.

An exemplary starting circuit for excitation of starter probe 12 comprises a resonant LC circuit of variable impedance including the series combination of a variable inductance, provided by starting coil 14 in the embodiment of FIG. 1, and the parasitic capacitance between the starter probe and the excitation coil. Such a starting circuit is described in U.S. Pat. No. 5,057,750, cited hereinabove. Other suitable resonant starting circuits are described in commonly assigned U.S. Pat. No. 5,103,140 of J.P. Cocoma and G.A. Farrall, issued Apr. 7, 1992, and commonly assigned U.S. Pat. No. 5,118,996 of S.A. El-Hamamsy, J.P. Cocoma and G.A. Fartall, issued Jun. 2, 1992, both of which patents are incorporated by reference herein.

In accordance with the present invention, the starting circuit further includes a visible light radiator 40, shown in FIG. 1 as a light emitting diode (LED). A resistor 42 is shown as being coupled in series with LED 40, and the other terminal of LED 40 is coupled to the starting circuit ground potential. Also shown in FIG. 1 is a light guide 44, e.g., comprising a quartz rod, for coupling the light from LED 40 to starting chamber 32 and also for protecting LED 40 from heat generated by starter probe 12 and lamp 10. LED 40, resistor 42 and quartz rod 44 are mounted on an insulator 46, e.g., comprising a laminated phenolic rod, such as, for example, bakelite manufactured by Union Carbide, which in turn is supported on capacitor plate 21 by a support 48 (e.g., of aluminum).

In operation, an RF signal is applied to excitation coil 18 via ballast 20 such that resonant operation of the LC starting circuit results in excitation of LED 40 and the application of a sufficiently high starting voltage to starting electrode 15 to ignite a glow discharge, i.e. a relatively low discharge current, in starting chamber 32. (Alternatively, LED 40 may be excited by separate excitation means of a type well known to those of ordinary skill in the art.) In turn, the starting voltage is capacitively coupled to arc tube 16, thereby ionizing the arc tube fill and initiating an arc discharge therein.

Advantageously and unexpectedly, by providing a visible light radiator as part of the starting circuit, ignition of a glow discharge, and hence an arc discharge, is enhanced even though little or no direct gas ionization is possible through the provision of visible light. The enhancement of discharge ignition is due, in part, to photoelectric emission from impurities on the walls of the starting chamber. The electrons are then accelerated by the starting voltage, resulting in the breakdown avalanche needed to ignite the discharge and hence start the lamp.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A starting circuit for an electrodeless high intensity discharge lamp of the type having an excitation coil situated about an arc tube for exciting an arc discharge in an ionizable fill contained in said arc tube, comprising:
   a starting probe disposed proximate to said arc tube, said starting probe comprising a translucent starting chamber having a wall enclosing an interior containing a gas;
   excitation means for providing a starting voltage to said starting probe for initiating a discharge in said chamber of sufficient magnitude for initiating an arc discharge in said arc tube; and
   visible light radiating means for illuminating said starting chamber during application of said starting voltage for enhancing initiation of the discharge therein.

2. The starting circuit of claim 1 wherein said starting chamber is attached to said arc tube and further comprises a starting electrode for coupling said starting voltage to the interior of said starting chamber.

3. The starting circuit of claim 1 wherein said visible light radiating means comprises an LED.

4. The starting circuit of claim 3, further comprising a light guide means between said LED and said starting probe.

5. The starting circuit of claim 1 wherein said excitation means comprises a resonant circuit for receiving a radio frequency signal from a radio frequency power supply, said starting voltage comprising a resonant starting voltage.

6. An electrodeless high intensity discharge lamp system, comprising:
   a light-transmissive arc tube for containing a fill;
   an excitation coil disposed about said arc tube and coupled to a radio frequency power supply for exciting an arc discharge in said fill;
   a starting probe disposed proximate to said arc tube, said starting probe comprising a translucent starting chamber having a wall enclosing an interior containing a gas;
   excitation means for providing a starting voltage to said starting probe for initiating a discharge in said chamber of sufficient magnitude for initiating an arc discharge in said arc tube; and
   visible light radiating means for illuminating said starting chamber during application of said starting voltage for enhancing initiation of the discharge therein.

7. The electrodeless high intensity discharge lamp system of claim 6 wherein said starting chamber is attached to said arc tube and further comprises a starting electrode for coupling said starting voltage to the interior of said starting chamber.

8. The electrodeless high intensity discharge lamp system of claim 6 wherein said visible light radiating means comprises an LED.

9. The electrodeless high intensity discharge lamp system of claim 8, further comprising a light guide means between said LED and said starting probe.

10. The electrodeless high intensity discharge lamp system of claim 6 wherein said excitation means comprises a resonant circuit for receiving a radio frequency signal from a radio frequency power supply, said starting voltage comprising a resonant starting voltage.

* * * * *